INVENTOR.
DOMINIC J. IAQUINTA
BY Louis Necho
ATTORNEY.

Aug. 22, 1967  D. J. IAQUINTA  3,336,963
ANTI-SKID DEVICE

Filed Nov. 12, 1965  4 Sheets-Sheet 2

INVENTOR.
DOMINIC J. IAQUINTA
BY
ATTORNEY.

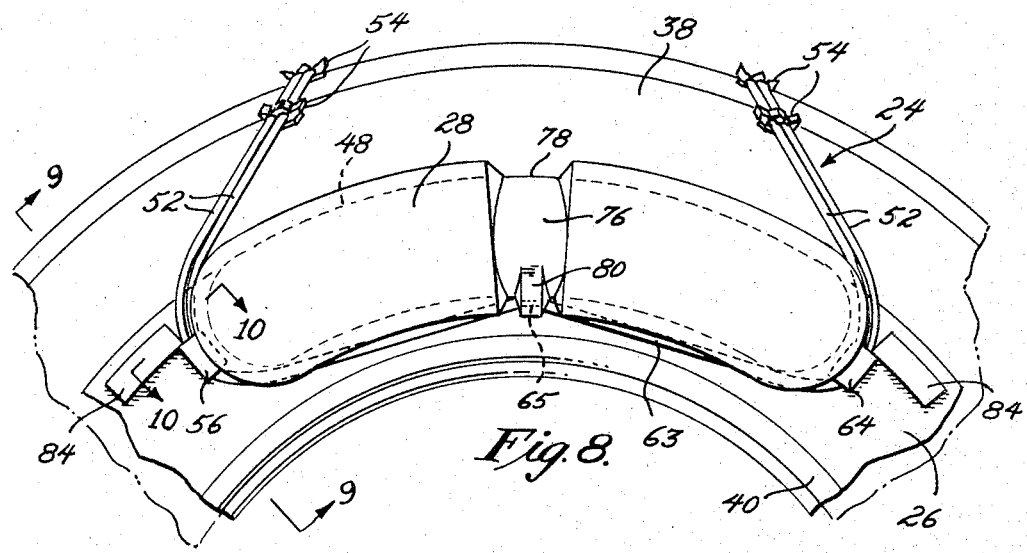
Fig. 8.
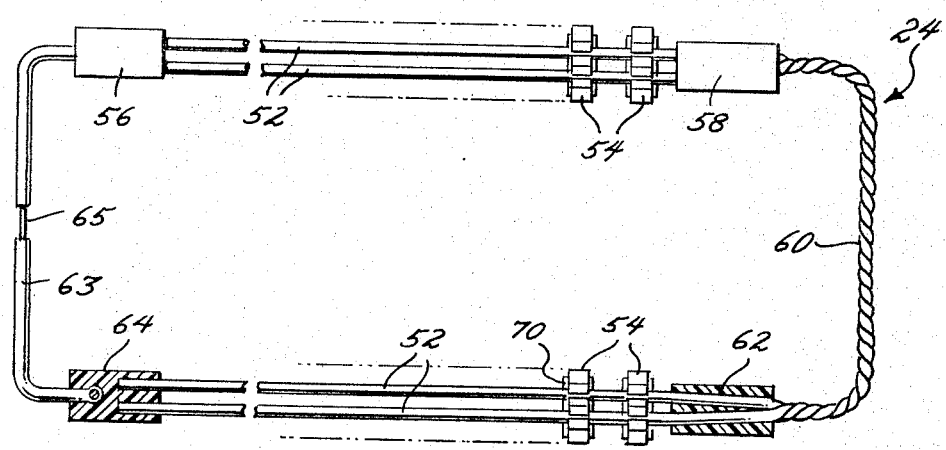
Fig. 5.
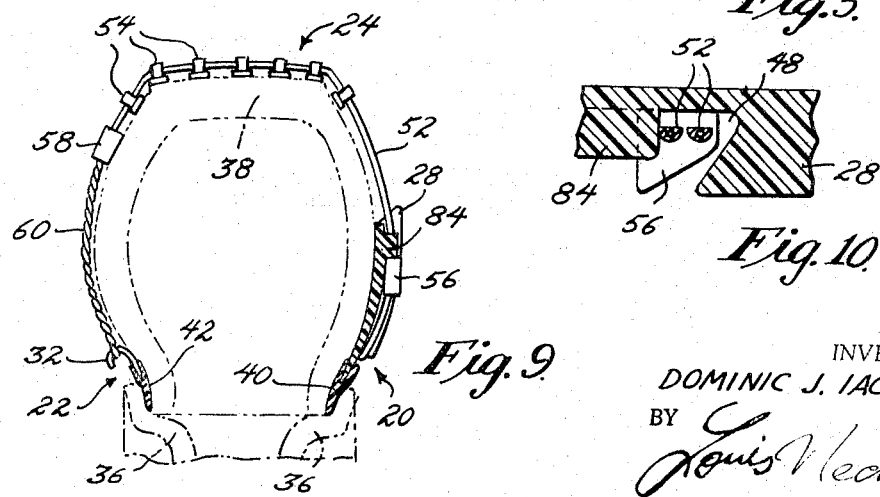
Fig. 9.
Fig. 10.
INVENTOR.
DOMINIC J. IAQUINTA
BY
ATTORNEY.

Aug. 22, 1967   D. J. IAQUINTA   3,336,963
ANTI-SKID DEVICE
Filed Nov. 12, 1965   4 Sheets-Sheet 4
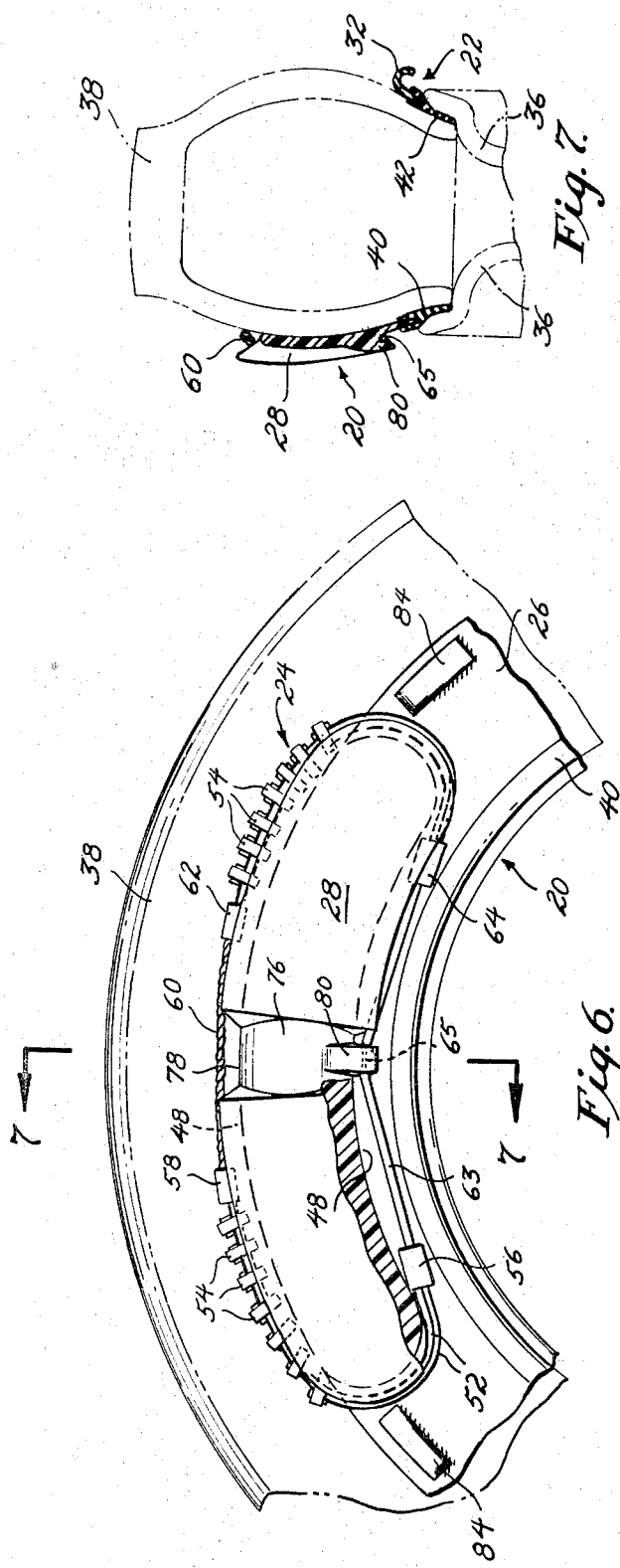
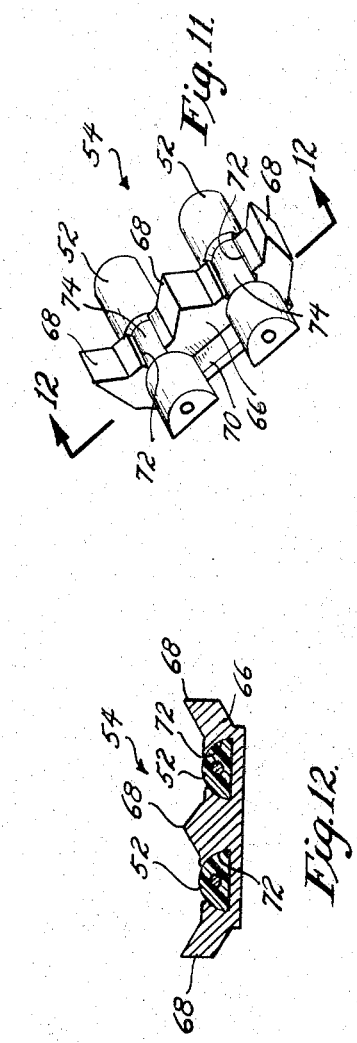
INVENTOR.
DOMINIC J. IAQUINTA
BY Louis Necho
ATTORNEY.

United States Patent Office 3,336,963
Patented Aug. 22, 1967

3,336,963
ANTI-SKID DEVICE
Dominic J. Iaquinta, 3811 N. 7th St.,
Philadelphia, Pa. 19140
Filed Nov. 12, 1965, Ser. No. 507,405
2 Claims. (Cl. 152—216)

This invention relates to an anti-skid device for use on an automobile tire or the like.

One object of this invention is to produce an improved anti-skid device of the type set forth.

Most commercial anti-skid devices are of the type which consist of two parallel lengths of chain with cross links connecting said chains in a ladder-like arrangement. To mount this device on a tire, the tire must first be raised off the ground and then said chain device is wrapped over the crest of the tire and secured thereto by separate links and tension straps. One problem encountered with this type of device is that repeated mounting and removal, as weather conditions demand, is a time-consuming and expensive process.

A further object is to produce an improved anti-skid device which may be permanently mounted on a wheel and which may be readily moved to an operative position and moved to an inoperative position easily and without special skill.

A further object is to produce an anti-skid device which is durable, lightweight, simple in construction, and which is not as unsightly as the chain-type of anti-skid device.

The full nature of this invention will be understood from the following specification and the accompanying drawings in which:

FIG. 5 is a top plan view of a traction unit.

FIG. 6 is an enlarged fragmentary side elevational view, partly in section and partly in elevation, and showing a traction unit of this invention in an inoperative or storage position on the inboard side of the wheel.

FIG. 7 is a view looking in the direction of line 7—7 on FIG. 6.

FIG. 8 is similar to FIG. 6 but shows the traction unit in an operative or use position.

FIG. 9 is a view looking in the direction of line 9—9 on FIG. 8.

FIG. 10 is a view looking in the direction of line 10—10 on FIG. 8.

FIG. 11 is a perspective view of one of the toothed ground-engaging members shown in FIG. 6.

FIG. 12 is a view looking in the direction of line 12—12 on FIG. 11.

Figure 2:
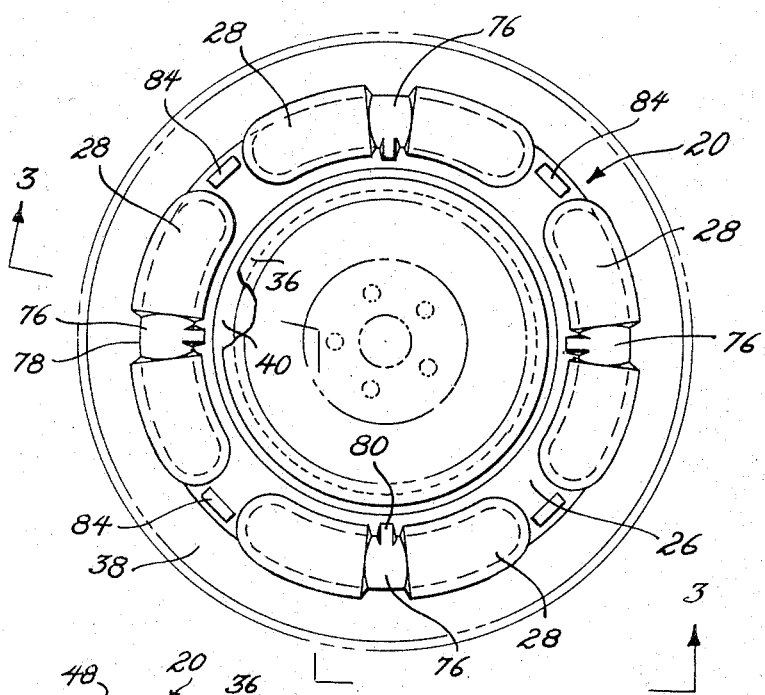
FIG. 2 is a side elevational view of the inboard side of an automobile wheel partly broken to show details of construction.
Figure 1:
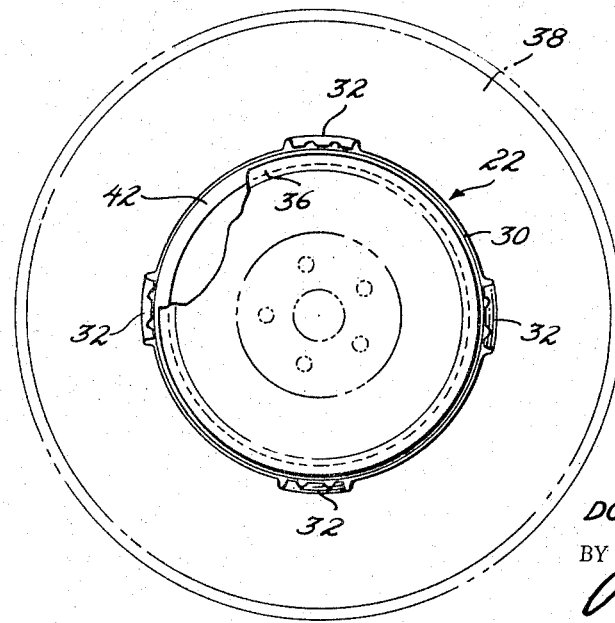
FIG. 1 is a side elevational view of the outboard side of an automobile wheel partly broken to show details of construction.

An anti-skid device embodying the invention includes an inboard supporting unit 20, FIG. 2, an outboard retaining unit 22, FIG. 1, and a plurality of traction units 24, FIG. 5. Inboard unit 20 is a thin circular ring 26 which carries on one side thereof four arcuate shaped traction unit storage members 28. Outer retaining unit 22 is a thin circular ring 30 which has four retaining hooks 32 which extend radially outward from its outer peripheral edge and which face one side of said ring.

Figure 3:
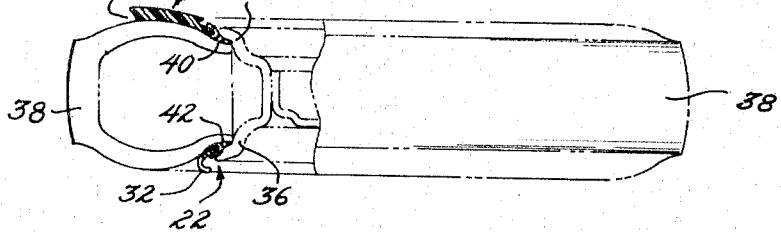
FIG. 3 is a view looking in the direction of line 3—3 on FIG. 2.
Figure 4:
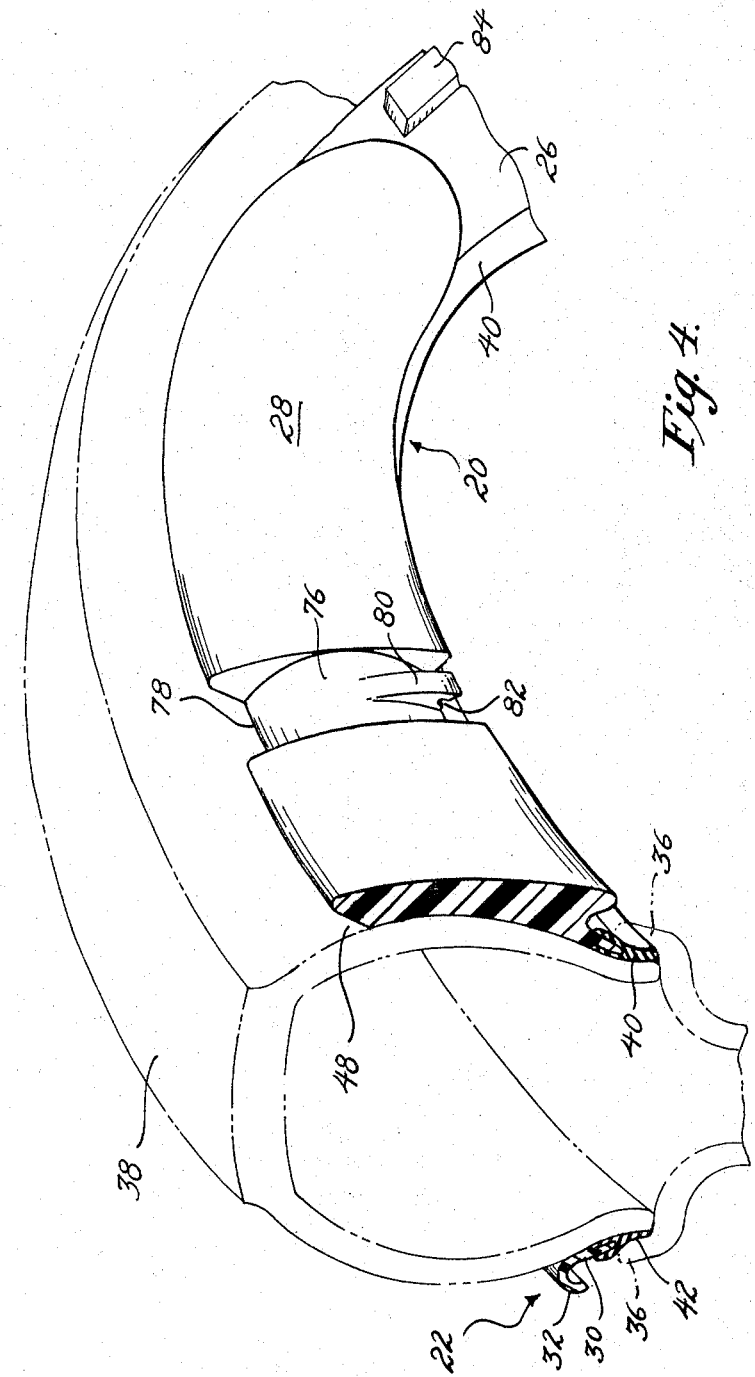
FIG. 4 is an enlarged, fragmentary perspective view of an automobile wheel embodying the invention.

An automobile wheel of the type referred to consists of a wheel rim 36 having inboard and outboard rims and a tire 38 which is forcibly held against said rim by air pressure. In order to position units 20 and 22 upon said wheel, the tire must first be deflated so that the inner and outer walls of said tire can be moved away from wheel rim 36. It should be noted that the inner peripheral edges of rings 26 and 30 are imbedded in rings 40 and 42 respectively. While the tire is deflated, rings 40 and 42 are positioned between wheel rims 36 and the inner and outer tire walls respectively as shown in FIGS. 3 and 4 for mounting rings 26 and 30 securely to said tire. Rings 40 and 42 are made of any suitable rubber or plastic material which is resilient enough to be "stretched" over said wheel rim and which will return to its normal state and which is strong enough to secure units 20 and 22 in place.

When units 20 and 22 are first positioned for mounting upon a wheel, each of the four retaining hooks 32, of outer unit 22, must be aligned across from a storage member 28 of the inboard unit to allow a traction unit 24 to be connected therebetween. Both the inboard and outboard units are made of a strong flexible thermoplastic or thermo-set which have properties of non-adhesiveness, strong wearability and molding processability. These types of plastics are commercially well known and are mentioned only by way of reference to suitable materials.

As seen in FIG. 4, the periphery of storage member 28 is beveled as at 48 to provide a channel, part of which is between said storage member and said tire and part of which is between said storage member and said ring for mounting a traction unit 24 therein. Said traction unit includes two connecting bands 52 to which are secured a plurality of toothed, ground-engaging members 54. Bands 52 are formed of a thermoplastic material and have a semi-circular cross section with steel wire core. It will be seen from FIG. 5 that one end of each band 52 is firmly anchored in a first thermoplastic block 56 and that the bands remain spaced and substantially parallel until they pass through a first guide block 58. Guide block 58 has two converging channels therein which guide the bands 52 into close proximity so that they may be twisted to form a single band 60 which continues to a second guide block 62 which has two diverging channels therein, whereby bands 52 are returned to their spaced apart substantially parallel position. The other end of each of bands 52 is anchored in a second block 64. The traction unit also comprises an elastic connector 63, the ends of which are anchored in blocks 56 and 64 and which has a reduced chamber section 65, the purpose of which will be subsequently explained.

As best shown in FIGS. 11 and 12, each ground engaging member 54 comprises a body 66 which is adapted to overlie the tread of the tire and which has teeth 68 which engage the road and a base 70. The body portion should be made of a strong rust-proof material and the teeth can be made of a still stronger material if desired. Body portion also has notches 72 of a generally truncated triangular configuration for receiving and retaining reduced diameter portions 74 of bands 52. The reduced portions of the bands are engaged with said body portion by introducing either edge of the reduced portion obliquely into a notch and then twisting the band until the parts assume the position as shown in FIGS. 11 and 12. It should be noticed that the shoulders which define or which are on either end of reduced diameter section 74 and engage the sides of body 66 prevent any longitudinal displacement or movement of ground engaging members 54 along connecting bands 52.

Traction unit 24 is mounted in channel 48 of channel member 28 as shown in FIG. 6 in which said traction unit is in an inoperative or storage position. As seen from FIGS. 4 and 6, each storage member 28 has a cut out as at 76 to provide a recess 78 which affords access to band 60 for the purpose hereinafter set forth. Each storage member 28 is provided with lug or extension 80 which is provided with a notch or recess 82 for receiving the reduced portion 65 of connector 63. Again, it should be noted that the shoulders which define reduced portion 65 engage the sides of lug 80 to prevent slippage of traction unit within channel 48.

The operation is as follows:

The inboard supporting unit 20 mounted on a wheel as shown in FIGS. 2 and 3 whereby it is completely hidden from view and the outboard retaining unit 22 is mounted as shown in FIGS. 1 and 2. A traction unit 24 is then mounted on each storage member of the inboard unit by first inserting reduced section 65 of connector 63 into notch 82 and then laterally stretching elastic connector 65 and forcing the traction unit over the periphery of said storage member. The elasticity of the connector causes said traction unit snugly to engage the storage member whereby the traction unit will be in an inoperative or storage position of FIGS. 6 and 7. When weather conditions demand the use of the traction unit, each traction unit 24 is manually pulled across the tire and secured to its corresponding retaining hook 32 of outer retaining unit 22, as shown in FIG. 9. This is accomplished by reaching over the tire and grasping band 60 and pulling it to draw the traction unit over the tread of the tire. Elastic connector 63 has the elasticity needed to allow the traction unit to be stretched over the tire tread and to hold the unit tightly in its operative position of FIGS. 8 and 9. As band 60 is pulled over the tire, it draws bands 52 across the tread of said tire until blocks 56 and 64 engage said fixed stops 84 as shown in FIGS. 8, 9 and 10, to limit the stretching of the unit to the extent needed to be engaged with retaining hook 32. The contact between blocks 56 and 64 and stops 84 also serves to transmit any strains and stresses to which the traction unit will be subject during use to the entire inboard supporting unit 20. As seen in FIG. 9, when traction unit 24 is in position, each ground engaging member 54 will have its base 70 in complete contact with the tire tread surface so as to provide maximum stability.

When road conditions make the use of the unit unnecessary, it is merely necessary to disengage band 60 from retaining hook 32 and release the same, whereby elastic connector 63 will pull said unit into storage position as shown in FIGS. 6 and 7.

What I claim is:

1. An anti-skid device for use on a tire seated on the rim of a wheel, said device including:
   a storage ring-like member abutting the inboard side of the tire and having its inner periphery clamped between the tire and the rim of the wheel,
   a plurality of storage members bulging from the surface of said ring,
   a plurality of traction units, one for each of said storage members,
   each traction unit comprising a flexible element,
   ground engaging elements carried thereby,
   an elastic element connecting the ends of said flexible element,
   a hook carried by said storage member and engageable with said elastic element,
   the periphery of said ring-like member being bevelled and coacting with the surface of the tire to form a channel for receiving said flexible element,
   a retaining ring clamped between the outboard side of the tire and the rim of the wheel, and
   a hook carried by said retaining ring-like member and engageable with said flexible element to retain the traction unit in a position in which said ground engaging elements are disposed across the tread of the tire.

2. The device defined in claim 1 wherein the length of each traction unit, measured with said elastic element relaxed, is less than the perimeter of the corresponding storage member whereby, when a traction unit is positioned on a storage member, it will tightly hug the storage member.

No references cited.

ARTHUR L. LA POINT, *Primary Examiner.*

R. A. BERTSCH, *Assistant Examiner.*